United States Patent [19]

Szyms

[11] Patent Number: 4,802,937
[45] Date of Patent: Feb. 7, 1989

[54] BELT AND TREAD TRANSFER RING AND DRUM EXPAND BLADDERS

[75] Inventor: Walter Szyms, Branford, Conn.

[73] Assignee: The Armstrong Rubber Co., New Haven, Conn.

[21] Appl. No.: 913,991

[22] Filed: Oct. 1, 1986

[51] Int. Cl.[4] .................................. B29D 23/00
[52] U.S. Cl. ............................ 156/118; 156/120
[58] Field of Search .............. 156/123, 133, 416, 324, 156/308.4, 118, 120, 218, 293; 264/173, 175, 172; 425/43, 45, 52, 53

[56] References Cited

U.S. PATENT DOCUMENTS

| | | | |
|---|---|---|---|
| 1,488,343 | 3/1924 | Hoffman | 156/128.1 |
| 1,607,356 | 11/1926 | McMahan | 425/52 |
| 1,714,016 | 5/1929 | Gammeter | 156/120 |
| 2,476,817 | 7/1949 | Charnes | 156/120 X |
| 2,514,183 | 7/1950 | Chandley | 156/120 X |
| 2,582,715 | 1/1952 | Murray | 425/53 |
| 2,595,127 | 4/1952 | Coffey | 264/175 |
| 3,547,734 | 12/1970 | Read | 156/416 |
| 3,615,987 | 10/1971 | Blatz | 156/133 |
| 3,963,394 | 6/1976 | Shichman et al. | 156/416 X |

Primary Examiner—Michael W. Ball
Assistant Examiner—Raymond Hoch
Attorney, Agent, or Firm—St. Onge Steward Johnston & Reens

[57] ABSTRACT

Belt and tread transfer ring bladders and belt and tread drum expand bladders for use in fabrication of tires are provided with reinforcing layers (preferably of aramid fiber or fabric). The bladders are prepared by assembling on a cylindrical drum, first and second continuous, partially cured rubber belts with a layer of reinforcing material sandwiched there between. One edge of the continuous belt-sandwich is folded towards the outer edge, the latter edge is folded inwardly so as to overlap said first fold and the assembly is then cured advantageously using steam and pressure. The overlapped folds in the resulting bladder from the surface of the bladder which contacts the workpiece during use as either a transfer ring bladder or drum expand bladder. The bladder of the invention is found to possess a significantly extended working life as compared to bladders hitherto available.

9 Claims, 1 Drawing Sheet

BELT AND TREAD TRANSFER RING AND DRUM EXPAND BLADDERS

BACKGROUND OF THE INVENTION

1. Field of the Invention

This invention relates to bladders used in tire building and is more particularly concerned with improved belt and tread transfer ring and drum expand bladders and with processes for the preparation thereof.

2. Description of the Prior Art

The fabric of fiber reinforcement of various types of bladder employed in tire building operations has been suggested in broad terms in the prior art. Illustrative of such prior art are Gostlin U.S. Pat. No. 1,378,172; Semler U.S. Pat. No. 1,910,128; Frolich et al. U.S. Pat. No. 2,305,412; Read U.S. Pat. No. 3,547,734; Nicholls et at U.S. Pat. No. 3,979,249; Schmit U.S. Pat. No. 3,990,930; Schichman et al U.S. Pat. No. 3,963,394 and Burley U.S. Pat. No. 4,249,979.

However, it has not previously been suggested that belt and tread transfer rings and belt and tread drum expand bladders could be reinforced using fabric, fibers and like reinforcing materials. Indeed, in view of the manner in which such rings and bladders have been prepared hitherto (by molding from extruded rubber sheet in closed molds), it is very difficult to devise any satisfactory method of introducing such reinforcement into these types of bladders.

It has now been found that the above types of bladders can be reinforced in a highly satisfactory manner by utilizing a novel process which will be described hereinafter. It has also been found that bladders prepared in accordance with this novel process exhibit markedly improved properties particularly in terms of the extended service life which they possess.

SUMMARY OF THE INVENTION

It is an object of the invention to provide reinforced structures which can be employed as belt and tread transfer ring and belt and tread drum expand bladders which possess markedly improved properties.

It is a further object of the invention to provide a novel process for fabricating reinforced structures which can be employed as belt and tread transfer ring and belt and tread drum expand bladders.

It is yet another object of the invention to provide belt and tread transfer ring and belt and tread drum expand bladders having improved strength and abrasion resistance in the areas which are employed to contact the workpieces during tire building operations.

These objects, and other objects which will become apparent from the description which follows, are achieved by the structures and process of the present invention. In one aspect the invention comprises a process for fabricating reinforced structures adapted to be employed as belt and tread transfer ring bladders and belt and tread drum expand bladders. The process comprises the steps of:

assembling a first continuous belt of partially cured rubber on a forming drum of cylindrical cross-section;

calendering on to the surface of said first belt at least one ply of a rubber impregnated reinforcing material selected from the group consisting of fabric and filaments;

assembling a second continuous belt of partially cured rubber over said rubber impregnated reinforcing material;

folding one edge of the resulting assembly inwardly towards the opposite edge of said assembly;

thereafter folding the opposite edge of said assembly inwardly so as to overlap the previously folded edge; and thereafter curing said assembly. The invention also comprises the reinforced structures derived by the above process of the invention.

DETAILED DESCRIPTION OF THE INVENTION

The invention will now be described with reference to the embodiments shown in the accompanying drawings.

Figure 1:
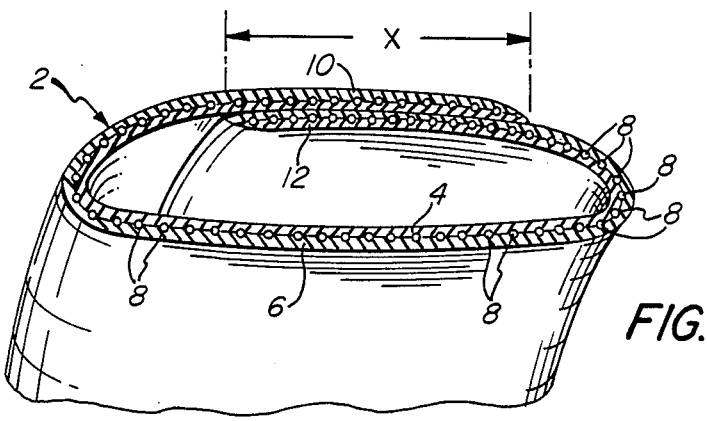
FIG. 1 is a cross-sectional view of a reinforced bladder in accordance with the invention.

A continuous tubular reinforced structure 2 in accordance with the invention is shown in FIG. 1. Strands or cords 8 of reinforcing material are sandwiched between layers 4 and 6 of rubber. In the area defined by X the abutting surfaces of the outer edges of the layers 4 and 6 are bonding together to form a double thickness of reinforced rubber. The area X forms the outer surface of the structure 2 which surface is the one which contacts the workpiece when the structure is employed either as a belt and tread transfer ring or as a belt and tread drum expand bladder. The reinforced structure 2 is also provided with conventional inflation valve means (not shown) disposed in, and projecting outwardly from, the side of the structure opposite that of the double thickness section represented by the area X.

Figure 2:
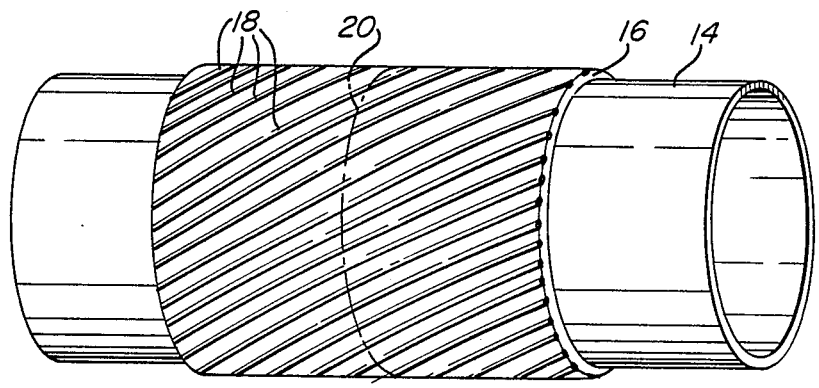
FIG. 2 is a perspective view of a partially assembled structure of the invention in place on a forming drum.
Figure 3:
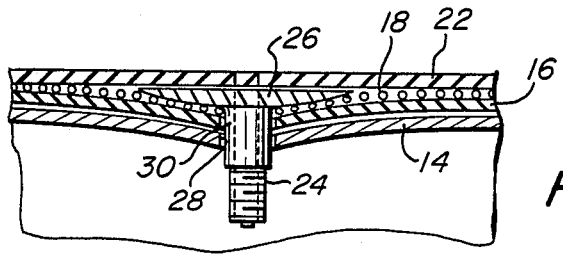
FIG. 3 is a cross-sectional part perspective view showing a detail of partially assembled structure of the invention in place on a forming drum.
Figure 4:
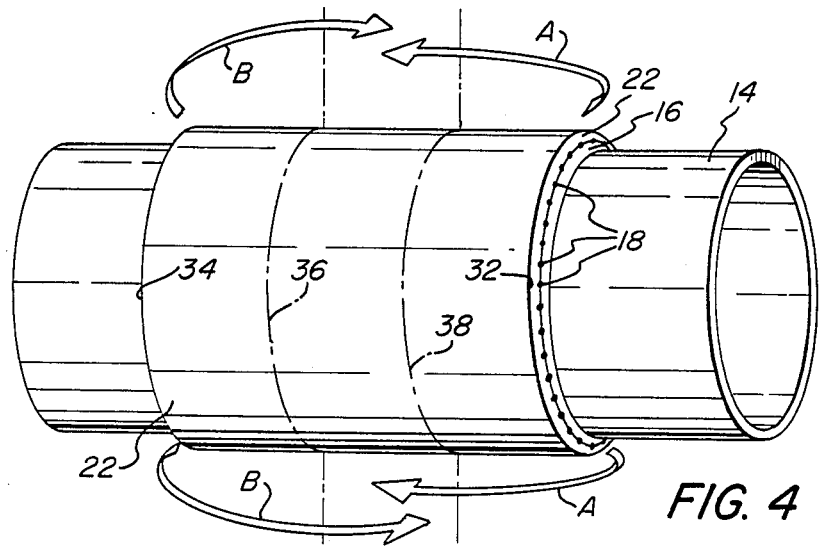
FIG. 4 is a further perspective view of a partially assembled structure of the invention in place on a forming drum.

The method of fabricating a reinforced structure of the invention is illustrated in FIGS. 2-4. In the first step of the method a continuous partially cured rubber belt 16 is assembled on a forming drum 14. The latter is advantageously a hollow cylindrical metal drum of appropriate diameter selected to yield the desired circumferential dimension in the finished reinforced structure 2 of the invention. In the second step of the method, reinforcing material in the form of a plurality of parallel cords or filaments 18 is assembled over the entire surface of the belt 16. Advantageously the cords 18 are calendered on to the belt 16 using conventional calendering means and techniques. The cords or filaments 18 have previously been coated with rubber or like bonding agents to ensure satisfactory adhesion of reinforcing material, in the ultimate curing step, to the rubber belt 16 and the second belt which is to be applied on the reinforcing material in the next step to be described below.

In a particular embodiment of the invention the cords 18 are aligned in parallel in a direction which forms an angle to the centerline 20 of continuous belt 16. This angle is advantageously of the order of about 45° to about 90° and preferably is about 90°.

In place of the cords 18 there can be employed as to reinforcing material a knitted or scrim fabric. Whether the reinforcing material is employed as individual cords or in the form of a fabric the material from which the cords or fabric are made is preferably an aramid of which the fiber available under the trademarks "Fiber B" and "Kevlar" is typical. In a particularly preferred embodiment the reinforcing material employed in the structures of the invention comprises aramid cords or filaments having a denier in the range of about 1000 to about 1500. Aramid is a generic name for fibers made from the condensation product of isophthalic or terephthalic acid and m- or p- phenylene diamine.

In the next step of the method of the invention a second continuous belt 22 of partially cured rubber is installed over the layer of reinforcing material 18 to give the preform as shown in FIG. 4. Prior to or during the installation of this second belt 22, inflation valve means is assembled in the preform in the manner illustrated in FIG. 3. As there shown valve 24 with attached flange 26 is assembled with said flange 26 disposed between first belt 16 and second belt 22 and with said valve 24 projecting through appropriate aperture 30 in first belt 16 and aperture 28 in the forming drum 14. The area surrounding the aperture 28 in drum 14 is advantageously in the form of a frusto-conical recess in- the surface of the drum 14, the recess being shaped to accommodate the flange 26. In the embodiment shown in FIG. 3 the valve 24 has been installed after the reinforcing material 18 has been placed over first belt 16. However, the valve 24 can also be installed before the reinforcing material is applied to the first belt 16 in which case the reinforcing material would be disposed between the After the second belt 22 has been installed as shown in FIG. 4 the peripheral edge 32 of the assembled preform is then folded in the direction shown by arrows A. The fold is preferably made about the line 38 which is disposed approximately one-third of the distance across the width of the assembly so that the edge 32 of the fold is located proximate the line 36 located up to about two-third of the distance across the width of the assembly. Thereafter the peripheral edge 34 of the assembly is folded inwardly about the line 36 so as to overlap the fold previously made. Prior to the folding steps described above those areas of the exposed surface of second belt 22 other than that in the area between line 36 and edge 34 are preferably coated with talc or like materials to prevent fusion of the inner surfaces of the reinforced structure, other than in the abutting surfaces of the overlapped portions, in the curing step.

The final step of the method of the invention is the curing of the assembled structure. This is advantageously accomplished using superheated steam at temperatures of the order of about 300° F. and in a closed vessel such as an autoclave. Optionally, but preferably, a sleeve of material such a nylon which shrinks under the influence of the steam curing conditions is used to encircle the overlapped portions of the structure. The sleeve is thereby shrink-fitted on to the exterior surface of the structure and exerts pressure thereon to facilitate bonding of the overlapped surfaces and also to ensure, a desirable profile on this exterior surface.

The structure thus prepared is found to have excellent strength and abrasion resistance and markedly improved service life as compared with structures previously employed in the art.

While the invention has been described with reference to certain specific embodiments thereof it is to be understood that these have been given for purposes of illustration only and are not to be construed as limiting. Modifications which can be made thereto without departing from the scope of the invention will be readily apparent to one skilled in the art.

What is claimed is:

1. In a process for fabricating reinforced structures adapted to be employed as belt and tread transfer ring bladders and belt and tread drum expand bladders in tire building operations the steps comprising, in the following sequence:
    assembling a first continuous belt of partially cured rubber on a forming drum of cylindrical cross-section;
    calendering at least one ply of rubber impregnated reinforcing material over substantially the whole of the surface of said first belt wherein said reinforcing material is selected from the group consisting of fabric and filaments;
    assembling a second continuous belt of partially cured rubber over said rubber impregnated reinforcing material, said first and second belts having substantially the same width and having their edges substantially in registry with each other;
    folding one edge of the resulting assembly inwardly towards the opposite edge of said assembly;
    thereafter folding the opposite edge of said assembly inwardly so as to overlap the previously folded edge, the location of the overlap being in the area of the finished structure which will contact the workpiece in said tire building operations; and
    thereafter curing said assembly.

2. The process of claim 1 wherein said reinforcing layer comprises rubberized aramid cord material.

3. The process of claim 2 wherein said aramid cord has a denier in the range of about 1000 to about 1500.

4. The process of claim 2 wherein said cord material is aligned in a direction forming an acute angle with respect to the centerline of said first continuous belt.

5. The process of claim 4 wherein said angle is approximately 90°.

6. The process of claim 1 wherein each of the folds has a width approximating one-third of the original width of the unfolded assembly.

7. The process of claim 1 wherein said final curing step is carried out using steam under pressure.

8. The process of claim 1 wherein pressure is applied to the exterior of the folded assembly during the final curing step of the process.

9. The process of claim 1 wherein inflation valve means is incorporated into said assembly.

* * * * *